Jan. 21, 1958     H. M. LOWE     2,820,315

FISH LURE

Filed Aug. 31, 1953

INVENTOR
HELEN M. LOWE
BY
Fetherstonhaugh & Co.
ATTORNEYS

United States Patent Office 2,820,315
Patented Jan. 21, 1958

2,820,315

FISH LURE

Helen M. Lowe, Roberts Creek, British Columbia, Canada

Application August 31, 1953, Serial No. 377,563

1 Claim. (Cl. 43—42.04)

This invention relates to improvements in fish lures.

An object of the present invention is the provision of a lure which, when pulled by a fish caught on a hook thereof, automatically embeds the hook in the fish, eliminating the necessity of the fisherman having to strike the fish.

Another object is the provision of a fish lure having a body formed of resilient material which, on being stretched, snaps back into its normal shape.

A further object is the provision of a lure formed of resilient material having means for preventing over-stretching without interfering with the normal snapping action of the material.

A further object is the provision of an elongated thin body to simulate a herring strip which is more pliable than a herring strip, unbreakable, and cannot be lost unless the line breaks.

Yet another object is the provision of a lure formed of suitably compounded latex having a natural glossy finish so that coloring may be incorporated in the material itself, eliminating the necessity of painting and polishing after use.

Still another object is the provision of a lure formed of resilient material which snaps back after being stretched, and having a plurality of hooks so arranged that when a fish is caught on one hook, the snapping action of the lure may thrust another hook into the fish.

In the past, herring strips have been used as lures for fish. These strips are difficult to handle and carry, and they often break or come off the hook. Most manufactured lures are too hard so that a fish is usually scared away if it strikes at them and is not hooked the first time. Furthermore, the fisherman has to remain alert in order to strike a fish which gets caught on a hook, that is, he has to jerk the line in order to sink the barbed end of a hook into the fish to prevent it from getting free therefrom.

The present invention overcomes these difficulties by providing a fish lure comprising a flexible body formed of resilient material which, on being stretched, snaps back to its normal shape, and one or more hooks connected to the body. This body is free to stretch when pulled by a fish caught on the hook or by a fish gripping the body. When the body snaps back to its normal position, it embeds the hook into the fish. If the fish has just gripped the body in its mouth, the snap action may thrust the hook into the fish. If the fish is not hooked, it may come back again since the soft flexible body feels more like a fish than some of the lures on the market prior to this invention. Securing means may be provided at one end of the lure body by means of which a line may be connected thereto. In order to prevent over-stretching of the body, a leader may extend from this securing means to a point spaced therefrom, and the hook may be connected to the leader at this point. Thus, when a line is attached to the securing means, it is connected to the hook through a leader. There is preferably an excess of leader between the hook and the securing means in order to permit the stretching of the flexible body. This leader is of such a length that it will become taut before the body is stretched to the breaking point.

An example of this invention is illustrated in the accompanying drawings, in which, Figure 1 is a side elevation of a fish lure, Figure 2 is a plan view of the device.

Figure 1:
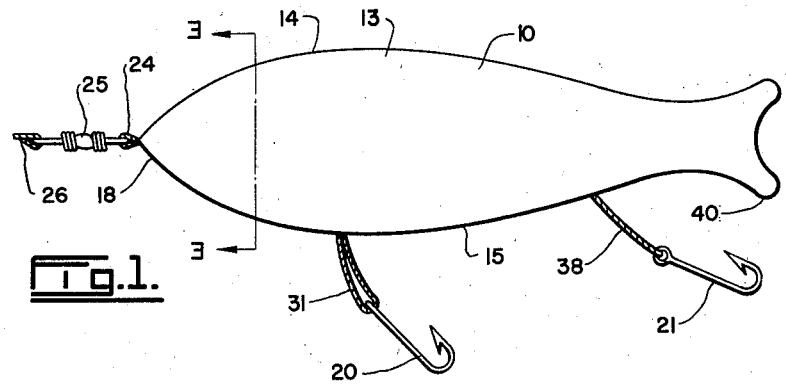
Figure 2:
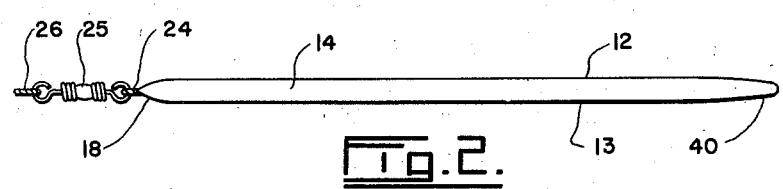

Referring to the drawings, the fish lure includes a body 10 formed of a resilient material which, on being stretched, snaps back to its normal shape. Any suitable material may be used for this purpose, but compounded rubber latex has been found to be the most advantageous since it naturally has a high gloss surface, and since coloring may be incorporated in the material itself so that it cannot wear off the lure. It is desirable to make the lure 10 long and thin in order to simulate a herring strip. Figure 1 shows an elongated body, while Figure 2 illustrates how thin it is relative to its height and length. It is preferable to make the body hollow as indicated at 11 in Figure 3, having opposite faces 12 and 13. It will be seen that the distance between the faces 12 and 13 is considerably less that that between the top 14 and bottom 15 of the lure body.

One or more hooks are provided spaced from each other and from the forward end 18 of the body 10. In this example, there are two hooks 20 and 21. Securing means is provided at the forward end of the body by means of which a fishing line may be connected thereto. In this example, the securing means consists of a ring 23 embedded in the material of the body at the forward end and has a leader 24 connected thereto which extends forwardly from the body. This leader may be tied to a fishing line or, as shown, a swivel 25 may be attached to the outer end thereof, and a fishing line 26 may be connected to this swivel. Another line or leader 28 is connected at one end to the ring 23 and extends to a point 29 in the body 10 spaced from the forward end thereof. A portion of this line or leader extends downwardly from the body in the form of a loop 31 at this point, and the hook 20 is loosely connected to this loop. It is desirable to secure the leader to the body at the point 29, and this may be done in any suitable way, such as by means of a ring 33 embedded in the material of the body at this point. The leader or line 28 continues from point 29 through the body 10 to another point 35 rearwardly spaced therefrom where it is preferably secured to the body in any convenient manner, such as by means of a ring 36 embedded in the material thereof. The leader emerges from the body at this point in an extension 38 to which the hook 21 is attached, said extension and hook being located near the after end 40 of the lure body.

It will be noted that there is an excess of line 28 between the securing means 23 and the point 29 and between the points 29 and 35, as indicated at 42 and 43, respectively.

When it is desired to use this lure, it is attached to the end of a fishing line 26 and drawn through the water in the usual manner. As the lure body is hollow, it is very buoyant and its action in the water will resemble that of a natural bait. When a fish is caught on either hook, the resulting pull tends to stretch the body 10. As this body is formed of resilient material, it snaps back to its normal position and this embeds the hook in the fish. Furthermore, it may thrust the other hook into the fish. The fact that the line 28 is anchored to the body 10 at the securing means 23 and at the points 29 and 35 ensures the body being stretched by a fish pulling on either hook. The excess of line at the portions 42 and 43 thereof permits this stretching and resulting snapping action, and yet the excess is only such that by the time either or both sections are straightened out or taut, the material of the body will not have reached its breaking or tearing point. Thus, the line 28 prevents overstretching of the material.

Figures 3, 5:
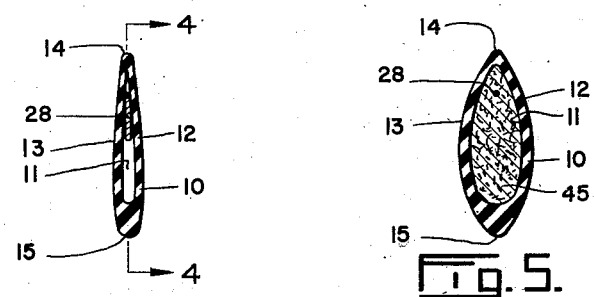
Figure 3 is a vertical cross section taken on the line 3—3 of Figure 1.
Figure 4:
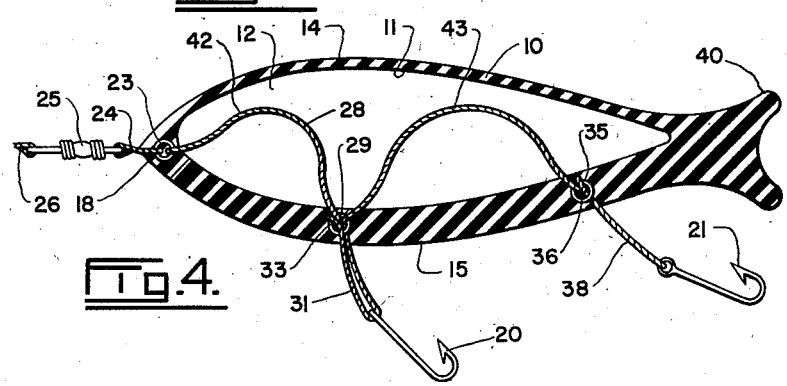
Figure 4 is a vertical longitudinal section through the lure taken on the line 4—4 of Figure 3, and, Figure 5 is a view similar to Figure 3 of an alternative form of the invention.

Figure 5 illustrates an alternative form of the invention. In this example, the hollow body 10 is filled with a suitable buoyant material 45, such as foam rubber or compounded latex sponge rubber. This buoyant material is stretchable the same as the body 10, and it includes individual air cells so that even if the body is punctured or torn, the lure will still retain considerable buoyancy.

What I claim as my invention is:

A fish lure comprising an elongated flexible hollow body formed of resilient material which on being stretched snaps back to its normal shape, said body being adapted to attract fish as it is being drawn through water, securing means at one end of the body by means of which a line may be connected thereto, attaching means embedded in a wall portion of the body, a line extending from the securing means within the body toward the opposite end thereof, said line being connected to said attaching means at points spaced from each other and from the securing means, one of said points being adjacent the end of the body opposite the end with the securing means and the line extending outwardly of the body from the latter point, a hook connected to said extended line and spaced from the body, and a hook outside the body connected to the line and at another point, said body stretching when pulled by a fish caught on the hook or gripping the body and snapping back and tending to embed one or both hooks in the fish.

References Cited in the file of this patent
UNITED STATES PATENTS

| | | |
|---|---|---|
| 841,429 | Passage | Jan. 15, 1907 |
| 1,296,057 | Ellsworth | Mar. 4, 1919 |
| 1,863,125 | Powell | June 14, 1932 |
| 2,110,382 | Martin | Mar. 8, 1938 |
| 2,117,322 | Hillman | May 17, 1938 |
| 2,136,713 | Schanabel | Nov. 15, 1938 |
| 2,235,600 | Ammerman | Mar. 18, 1941 |